May 9, 1967  L. PARIS  3,318,000
DENTAL ROOT CANAL FILLING POINT
Filed April 6, 1964

3,318,000
DENTAL ROOT CANAL FILLING POINT
Lawrence Paris, 11 5th Ave., Augusta, Maine 04330
Filed Apr. 6, 1964, Ser. No. 357,569
4 Claims. (Cl. 32—15)

The present invention relates to dental root canal filling points.

Such filling points are employed by dentists in filling the pulp canals of teeth from which the pulp tissue has been removed. Commonly such root canal filling points are manufactured of gutta percha or silver and are made cone shaped, tapering uniformly to a fine end which is supposed to fit tightly against the root canal at the apex. When a tooth is treated endodontically and the pulp tissue removed, the root canal is scraped to an approximate cone shape, with the smallest diameter of the canal at the apex. It is critically important to obtain a tight fit of the filling point at the apical area so as to provide as nearly as possible a hermetic seal at this point. The clinical test of a good fit is considerable friction with a filling point of the correct length as the point is moved into the root canal. The currently used cone-shaped points are likely to produce friction at some spot or spots along the root canal spaced from the apex, where the conical filling point has a greater diameter than at its tip. This is particularly apt to happen when the tooth root canal is not perfectly conical or if the conventional filling point is not correspondingly conical. During root canal treatment with currently used conical filling points, the operator has no way of knowing if such is the case. Thus, if it happens that the conical filling point makes contact with the root canal at a point spaced from the apex, then there is risk that the fine tip of the filling point will not seal off the end of the root canal and consequently a good tight seal at the apex will not be obtained.

An object of the invention is to provide a dental root canal filling point of improved construction.

Another object of the invention is to provide a dental root canal filling point of improved construction which will obviate, or tend to reduce, the risk of inadequate sealing of the root canal at the apex.

A further object is to provide an improved dental root canal filling point which will aid the operator in producing a good dense root canal filling and tight sealing of the tooth at the apex.

Other and further objects, features and advantages of the invention will become apparent from the following description of a presently preferred embodiment of the invention wherein reference is made to the accompanying drawing, in which FIG. 1 is a vertical sectional view of a tooth wherein a filling point of the invention has been placed in each of two of the root canals;

Figure 1:
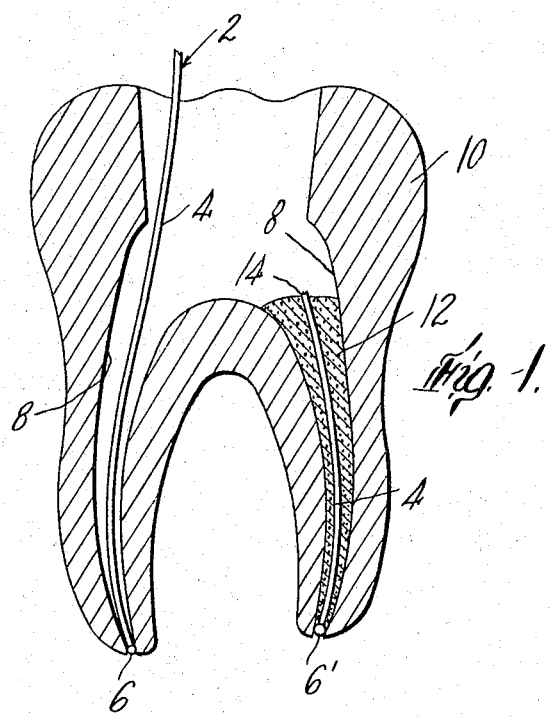
Figure 2:
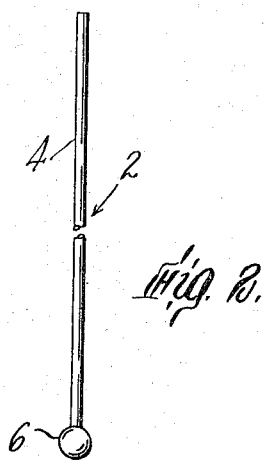
FIG. 2 is an elevation of the filling point.
Figure 3:
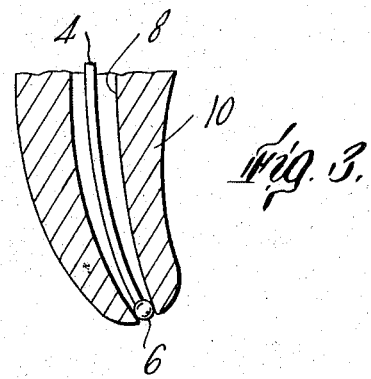
FIG. 3 is a detailed view to an enlarged scale of the apical area of a root of a tooth containing the filling point of FIG. 2.

In accordance with the invention I provide a dental root canal filling point which comprises an elongated shank having at one end an enlarged end which has a smoothly curved convex surface substantially circular in cross section at the greatest transverse dimension of the enlargement. The enlargement may be egg-shaped, or shaped like a football, or of other shapes providing at the region of its greatest transverse dimension a smoothly curved convex outer surface substantially circular in cross-section. The enlargement thus gradually and smoothly decreases in transverse dimensions above and below its largest transverse cross section. Preferably, the enlargement is substantially spherical in shape, as in the embodiment selected for purposes of illustration of the invention and shown in the drawing.

Referring to the drawing, the illustrative filling point 2 consists of a shank 4 of uniform round stainless steel wire approximately 0.020 inch in diameter and about one inch long. Formed at one end of the shank 4 is an enlargement consisting of a stainless steel sphere 6. The sphere 6 may be separately formed and attached to the shank 4 by fusing, welding, brazing, soldering or otherwise attaching it thereto, or the sphere may be formed from the material of the shank 4 by appropriately reshaping the shank at this point. It is an essential feature of the invention that the sphere 6 be greater in diameter than the adjacent diameter of the shank 4.

Ordinarily, the points will be made in sets of several points, all the same except that the spheres 6 at the ends of the points are of different sizes. For example such a set may include 10 points, one having a sphere 6 barely larger than the shank 4 and the others having spheres of gradually larger diameters up to a diameter at least double that of the shank 4. While in the preferred embodiment selected for purposes of illustration the shank 4 is circular in cross section, this is not an essential feature of the invention as the shank may be of other cross sectional shapes, for example, square. Preferably, the shank 4 is of uniform diameter throughout its length although, again, this is not essential as it may taper provided it is of distinctly smaller diameter than the sphere 6 at all points along its length which are apt to engage with the root canal, so that there will be no substantial risk that the shank will engage the canal when the sphere 6 does not engage the canal and thus give a false indication to the dental operator as to where the point is making contact with the canal. I mention a diameter of 0.020 inch as satisfactory, but as those skilled in the art will appreciate the diameter may depart from this size while still obtaining satisfactory results. The point may be made of any suitable material, e.g., silver, gold, stainless steel, or non-metallic material, e.g., gutta percha.

When employing the point of the invention, a point of the correct length and size is selected and is inserted in the root canal 8 of the tooth 10 in the usual way, the canal 8 having first been prepared in the conventional manner. In the tooth 10 one root contains a filling point having a sphere 6 of one size and another root contains a filling point having a sphere 6' of a larger size. When a point of the correct length produces good friction when inserted to the canal apex, a tight fit at the apex is assured since the sphere 6 is the largest diameter of the filling point and is in contact with the smallest diameter of the tooth root canal. The remainder of the canal treatment is carried out as usual, a self-setting liquid type cement normally being first placed in the canal and subsequently hardening when the canal filling point is in place. Thereafter gutta percha material 12 is inserted into the canal above the sphere 6 and about the shank 4. With the sphere 6 jammed tightly at the apex of the root canal, and with sufficient space around the narrow shank 4 for instrumentation, lateral condensation of the gutta percha 12 may be carried out with considerable force, producing a denser root canal filling without the danger of squeezing filling material beyond the apex. The filling point of the invention thus provides the benefit that good condensation with such added filling materials is far easier with this point because more space is available crown-ward of the apex for instrumentation and application of pressure, and the filling material cannot readily escape at the apex.

Any unneeded portion of the shank at its upper end is removed by severing the shank at the desired point, as at 14. The restoration is completed by filling the cavity at the crown with an appropriate cavity filling material, e.g., silver amalgam, gold and the like.

I claim:
1. A dental root canal filling point adapted to be placed in a tooth root canal from which the pulp has been removed and to remain permanently in place therein, comprising an elongated relatively thin shank having permanently connected to one extremity thereof a terminal enlargement of greater diameter than the adjacent portion of the shank and adapted to be placed in the root canal, said terminal enlargement having a smoothly curved convex exterior surface substantially circular in cross section at its greatest transverse dimension, whereby upon manipulation by the operator of the filling point in the root canal, the operator can accurately determine the exact position at which the canal is engaged by the point, by virtue of the fact that the filling point makes frictional engagement with the root canal wall only at the enlargement.

2. The dental root canal filling point of claim 1 wherein said shank is of uniform thickness throughout its length.
3. The dental root canal filling point of claim 1 wherein said enlarged end is spherical.
4. The dental root canal filling point of claim 3 wherein said shank is circular in cross-section and of uniform diameter throughout its length.

References Cited by the Examiner

UNITED STATES PATENTS

| | | | |
|---|---|---|---|
| 1,312,120 | 8/1919 | Hurtt | 32—15 |
| 1,469,992 | 10/1923 | Card | 128—260 |
| 2,121,875 | 6/1938 | Kruse et al. | 32—1 |

RICHARD A. GAUDET, *Primary Examiner.*

ROBERT E. MORGAN, *Examiner.*